United States Patent
Cady (10) Patent No.: US 11,005,714 B2
(45) Date of Patent: May 11, 2021

(54) METHOD AND SERVER FOR ASSIGNING TOPOLOGICAL ADDRESSES TO NETWORK SWITCHES, CORRESPONDING COMPUTER PROGRAM AND SERVER CLUSTER

(71) Applicant: BULL SAS, Les Clayes-sous-Bois (FR)

(72) Inventor: Alain Cady, Les Ulis (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/227,181

(22) Filed: Dec. 20, 2018

(65) Prior Publication Data

US 2019/0215242 A1 Jul. 11, 2019

(30) Foreign Application Priority Data

Dec. 21, 2017 (FR) ...................................... 1762750

(51) Int. Cl.
*H04L 12/24* (2006.01)
*H04L 12/741* (2013.01)
*H04L 29/12* (2006.01)

(52) U.S. Cl.
CPC ...... *H04L 41/0886* (2013.01); *H04L 41/0806* (2013.01); *H04L 41/12* (2013.01);
(Continued)

(58) Field of Classification Search
CPC ...... H04L 41/0806; H04L 41/12; H04L 61/20
See application file for complete search history.

(56) References Cited

U.S. PATENT DOCUMENTS 6,597,691 B1 * 7/2003 Anderson ................ H04Q 3/68
 370/360
8,429,325 B1 * 4/2013 Onufryk ............. G06F 13/4022
 710/312

(Continued)

FOREIGN PATENT DOCUMENTS

WO  WO 2016/070813 A1  5/2016
WO  WO-2016070813 A1 *  5/2016 ......... H04L 12/4015

OTHER PUBLICATIONS

Search Report as issued in French Patent Application No. 1762750, dated Oct. 24, 2018.
(Continued)

*Primary Examiner* — William G Trost, IV
*Assistant Examiner* — Monishwar Mohan
(74) *Attorney, Agent, or Firm* — Arc IP Law, PC; Joseph J. Mayo (57) ABSTRACT

A method for automatically assigning individual topological addresses to network switches includes obtaining first individual topological addresses each of which includes one identifier of a hierarchical level and N−1 non-hierarchical identifier(s) of the network switch with which it is associated, N≥2. It further includes the transcoding of each first individual topological address by subdividing the N−1 non-hierarchical switch identifier(s) as a function of a value of the hierarchical level identifier into one or more sub-topology identifiers separated from one another by at least one first separator character, forming a first character string, and into one or more switch identifier(s) separated from one another by at least one second separator character, forming a second character string. A second hierarchical individual topological address is thus constituted by concatenation including the first and second character strings, as well as a third separator character therebetween.

10 Claims, 3 Drawing Sheets

(52) U.S. Cl.
CPC .............. *H04L 45/74* (2013.01); *H04L 61/20* (2013.01); *H04L 61/2038* (2013.01); *H04L 61/6004* (2013.01)

(56) References Cited

U.S. PATENT DOCUMENTS

| | | | |
|---|---|---|---|
| 2003/0021273 A1* | 1/2003 | Fouquet | H04L 29/12311 370/392 |
| 2003/0023747 A1* | 1/2003 | Fouquet | H04L 29/12311 709/238 |
| 2005/0122956 A1* | 6/2005 | Bergmann | H04L 63/08 370/351 |
| 2007/0005808 A1* | 1/2007 | Day | H04L 41/145 709/248 |
| 2008/0235430 A1* | 9/2008 | Boyd | G06F 13/4022 710/316 |
| 2009/0164694 A1* | 6/2009 | Talayco | G06F 13/4022 710/316 |
| 2009/0198863 A1* | 8/2009 | Gregg | G06F 13/4027 710/316 |
| 2010/0250813 A1* | 9/2010 | Barthel | G05B 19/0421 710/301 |
| 2012/0089721 A1* | 4/2012 | Day | H04L 49/90 709/223 |
| 2012/0215891 A1* | 8/2012 | Lessmann | H04L 41/0809 709/220 |
| 2013/0083701 A1* | 4/2013 | Tomic | H04L 12/462 370/255 |
| 2014/0229945 A1* | 8/2014 | Barkai | H04L 49/70 718/1 |
| 2014/0269726 A1* | 9/2014 | Day | H04L 69/22 370/392 |
| 2015/0026385 A1* | 1/2015 | Egi | H04L 47/785 710/314 |
| 2015/0249590 A1* | 9/2015 | Gusat | H04L 45/122 370/392 |
| 2015/0356215 A1* | 12/2015 | Cady | G06F 17/5009 703/21 |
| 2016/0012004 A1* | 1/2016 | Arimilli | G06F 13/4027 710/306 |
| 2016/0134564 A1* | 5/2016 | Egi | H04L 41/12 370/401 |
| 2016/0366045 A1* | 12/2016 | Quintin | H04L 45/021 |
| 2017/0171072 A1* | 6/2017 | Bogdanovic | H04L 45/04 |
| 2017/0195162 A1* | 7/2017 | Enrique Salpico | H04L 29/06149 |
| 2017/0310574 A1* | 10/2017 | Wolting | H04L 49/70 |

OTHER PUBLICATIONS

Zahavi, E., "D-Mod-K Routing Providing Non-Blocking Traffic for Shift Permutations on Real Life Fat Trees," Internet Citation, Sep. 2010, Retrieved from the Internet: URL:http://webee.technion.ac.il/publication—link/index/id/574, XP002686713, 8 pages.

* cited by examiner

METHOD AND SERVER FOR ASSIGNING TOPOLOGICAL ADDRESSES TO NETWORK SWITCHES, CORRESPONDING COMPUTER PROGRAM AND SERVER CLUSTER

CROSS-REFERENCE TO RELATED APPLICATIONS

This application claims priority to French Patent Application No. 1762750, filed Dec. 21, 2017, the entire content of which is incorporated herein by reference in its entirety.

FIELD

This invention relates to a method for automatically assigning individual topological addresses to network switches of a network comprising transmission segments, the network switches interconnected via these transmission segments and compute or service nodes connected to ports of at least one portion of the network switches. It also relates to a computer program and a server for assigning topological addresses for implementing this method, in addition to a cluster of servers comprising such a server.

BACKGROUND

It applies to complex networks such as server clusters, however is not limited thereto. It is true that for clusters of servers, often comprising a high number of compute and service nodes interconnected to one another by at least one signal and data transmission network, via a set of switches forming the transmission nodes of the network, the addressing of the switches is a delicate issue that can be complex depending on the network topology. The clusters of servers are computer facilities that generally comprise a plurality of powerful networked computers with a shared storage device made up of storage bays, which will appear from the outside as a computer with a very high computing power, referred to as a High Performance Computer or HPC. These optimized facilities allow complex processing operations and/or parallel computations to be distributed over at least one portion of the compute nodes. The switches are beneficially assigned addresses which reflect the topology of these networks.

However, the topologies of networks of compute and service nodes, in particular HPCs, are extremely varied and can be structured according to a certain mathematical formalism, such as for networks with a hierarchical topology in the form of Fat-Trees such as for XGFT networks (for "eXtended Generalized Fat-Trees") and PGFT networks (for "Parallel ports Generalised Fat-Trees"), or such as for mesh networks or 3D-torus networks. They can also be unstructured when no predetermined mathematical formalism is capable of describing the organization thereof.

According to another feature, the topologies of these networks can be qualified as direct, when each switch has at least one port connected to at least one compute or service node, or indirect, when only certain switches have at least one port connected to at least one compute or service node. In an indirect topology, the fact that access to the compute or service nodes is obtained from the switches according to unequal distances in terms of the switches to be passed in order to reach these nodes establishes at least implicitly a hierarchy and level differences between the switches. However, even in a direct topology, level differences can be defined, for example as a function of a geographical distribution of the switches (in planes, rows, columns, etc.) or of any other possible switch hierarchy.

In this context, assigning a topological address to each switch of the network, not only as a function of identifiers specific thereto, but also as a function of a level identifier identifying the level in which it is situated in the network, is beneficial.

The invention thus more specifically applies to a method for automatically assigning individual topological addresses of the aforementioned type, wherein first individual topological addresses expressed in a non-hierarchical addressing system are obtained for all of the network switches, each individual topological address comprising N identifiers, N≥2, including:
  one identifier of a hierarchical level of the network switch with which it is associated in the network, and
  N−1 non-hierarchical identifier(s) of the network switch with which it is associated in the network.

DESCRIPTION OF THE PRIOR ART

The article by Zahavi entitled "D-Mod-K routing providing non-blocking traffic for shift permutations on real life fat trees", published online as CCIT Report #776, dated September 2010, proposes assigning a N-tuple address for each switch of a PGFT network. In this type of highly-structured network according to a clearly hierarchical tree of a plurality of switch levels, the first component of the N-tuple identifies the hierarchical level of the switch considered and the N−1 other components of the N-tuple identify the switch in the level thereof in a non-hierarchical manner according to a rule that allows the tree structure of the switches to be identified, from a root of this tree structure to the leaves formed by the switches, at least one port whereof is connected to at least one compute or service node. However, the address itself does not directly reflect the hierarchical structure of the network and not all of the addresses can be easily organized into this hierarchy. At most, the addresses in N-tuples can be classed into hierarchical levels.

This then raises an issue concerning the recording, management and handling of the addresses and other switch information in routine network management. This information is required for network administration and even forms one of the routine functions of an administration server and administration database, included in a data storage bay, which form two service nodes generally present in the cluster server networks for HPCs.

There is therefore a desire to provide a method for automatically assigning individual topological addresses to network switches that overcomes at least part of the aforementioned problems and constraints.

SUMMARY

It is thus proposed a method for automatically assigning individual topological addresses to network switches of a network comprising transmission segments, the network switches interconnected via these transmission segments and compute or service nodes connected to ports of at least one portion of the network switches, the method comprising obtaining first individual topological addresses expressed in a non-hierarchical addressing system for all of the network switches, each individual topological address comprising N identifiers, N≥2, including:
  one identifier of a hierarchical level of the network switch with which it is associated in the network, and
  N−1 non-hierarchical identifier(s) of the network switch with which it is associated in the network, the address assignment method further comprising the transcoding of each first individual topological address into a second hierarchical individual topological address according to the following transcoding steps of:

subdividing the N−1 non-hierarchical switch identifier(s) as a function of a value of the hierarchical level identifier:

into i sub-topology identifier(s), 0≤i≤N−1, separated from one another when there are at least two thereof by at least one first hierarchical level separator character, thus forming a first character string, and into j switch identifier(s), j=N−1−i, separated from one another when there are at least two thereof by at least one second identifier separator character that is different from the first separator character, thus forming a second character string, constituting the second hierarchical individual topological address by a concatenation of characters including at least the first character string, the second character string, and a third separator character between the first and second character strings.

Thus, by transcoding the first individual topological addresses as described above, the arrangement of the switch considered, in a reconstituted hierarchical structure of the topological addresses and of the network itself, is made to appear in each second topological address and in an explicit manner, in particular thanks to the first and second different separator characters. This allows these addresses to be recorded in a natural manner in the network for simplified management and handling of switch addresses and the information with which they are associated, in particular information regarding the switches. The equipment, compute or service nodes directly connected to the switches must simply be identified or located as a function of the switch port to which they are each connected in order to also apply this cleverly transcoded addressing system thereto. The information regarding the latter can thus also be recorded and handled in a simplified manner using this reconstituted structure of hierarchical topological addresses.

Optionally:
the first individual topological addresses are expressed in an addressing system in N-tuple,
the hierarchical level identifier identifying the hierarchical level of each first individual topological address forms a first component of the N-tuple and takes on a value in an affine relationship with j, and
the N−1 non-hierarchical switch identifier(s) of each individual topological address forms (form) the N−1 other component(s) of the N-tuple.

Also optionally, the value taken by the hierarchical level identifier of each first individual topological address:
lies in the range 0 to N−1, whereby the value 0 is reserved to the network switches having at least one port to which at least one compute or service node is connected, and
is equal to j.

Also optionally, obtaining the first individual topological addresses of the network switches comprises automatically determining the hierarchical level identifier of each network switch by assigning to the identifier a value equal to the minimum between N−1 and the minimum number of other network switches that must be passed in order to reach any one of the compute or service nodes from the network switch considered. In other words, the hierarchical level identifier has a value that is equal to the minimum number of other network switches that must be passed in order to reach any one of the compute or service nodes from the network switch considered, bearing in mind that this value must also remain within the range 0 to N−1.

Also optionally, a method for automatically assigning individual topological addresses according to an embodiment of the invention can further comprise the recording of the second hierarchical individual topological addresses in a storage device in one of the following formats:

in a system of directories and computer files automatically constituted using the second hierarchical individual topological addresses, which are themselves automatically recorded in this system of directories and files from the succession of first separator(s) and of each sub-topology identifier that they contain, or in a database system, the second hierarchical individual topological addresses being accessible in the database system using access keys defined from the succession of first separator(s) and of each sub-topology identifier that the second hierarchical individual topological addresses contain, or in a hash table system indexed by keys defined from the succession of first separator(s) and of each sub-topology identifier that the second hierarchical individual topological addresses contain.

Also optionally, another first separator character is added at the head of each second hierarchical individual topological address in order to identify the root of a tree structure defined by the set of the second hierarchical individual topological addresses.

Also optionally, the first separator character is a slash "/", the second separator character is a period ".", the third separator character is identical to the first separator character and each sub-topology identifier or switch identifier of each second hierarchical individual topological address is an integer.

It is further proposed a computer program that can be downloaded from a communication network and/or saved on a non-transitory computer-readable medium and/or executable by a processor, comprising instructions for carrying out the steps of a method for automatically assigning individual topological addresses according to the invention, when the program is executed on a computer.

It is also proposed a server for automatically assigning individual topological addresses to network switches of a network comprising transmission segments, the network switches interconnected via these transmission segments and compute or service nodes connected to ports of at least one portion of the network switches, the assignment server comprising a system for obtaining first individual topological addresses expressed in a non-hierarchical addressing system for all of the network switches, each individual topological address comprising N identifiers, N≥2, including:

one identifier of a hierarchical level of the network switch with which it is associated in the network, and
N−1 non-hierarchical identifier(s) of the network switch with which it is associated in the network, the assignment server further comprising a transcoder transcoding each first individual topological address into a second hierarchical individual topological address according to the following predefined transcoding rules of:

subdividing the N−1 non-hierarchical switch identifier(s) as a function of a value of the hierarchical level identifier:

into i sub-topology identifier(s), 0≤i≤N−1, separated from one another when there are at least two thereof by at least one first hierarchical level separator character, thus forming a first character string, and into j switch identifier(s), j=N−1−i, separated from one another when there are at least two thereof by at least one second identifier separator character that is different from the first separator character, thus forming a second character string, constituting the second hierarchical individual topological address by a concatenation of characters including at least the first character string, the second character string, and a third separator character between the first and second character strings.

It is further proposed a cluster of servers comprising transmission segments, network switches interconnected via these transmission segments and compute and service nodes connected to ports of at least one portion of the network switches, wherein at least one service node is a server for automatically assigning individual topological addresses according to the invention.

BRIEF DESCRIPTION OF THE DRAWINGS

The invention will be better understood after reading the following description, which is provided for purposes of illustration only and with reference to the accompanying drawings, wherein.

DETAILED DESCRIPTION

Figure 1:
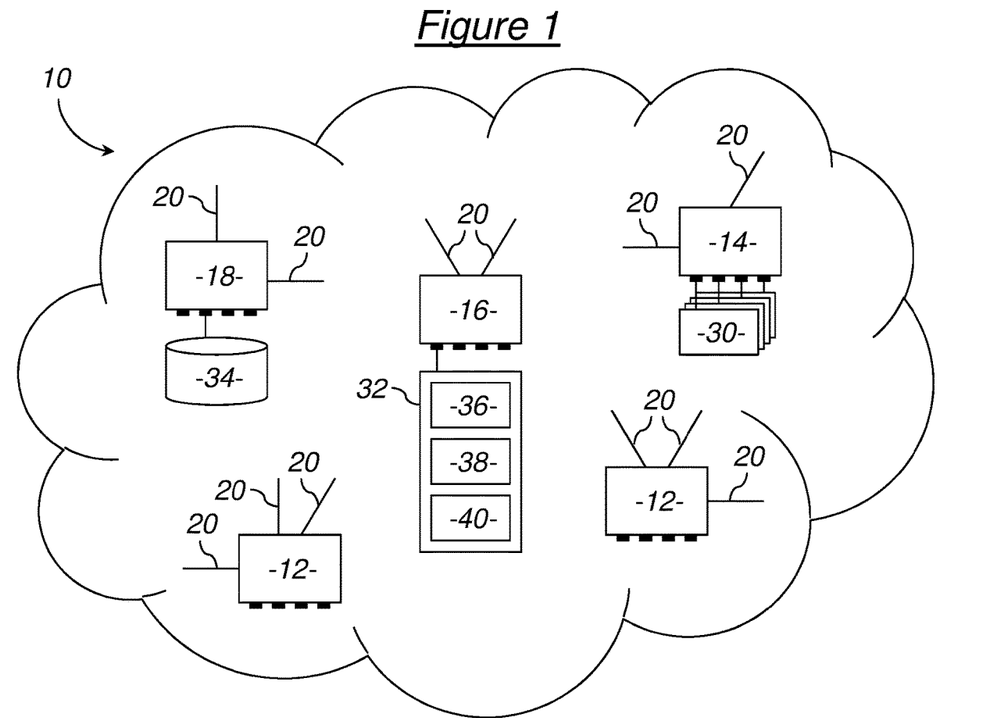
FIG. 1 diagrammatically shows the overall structure of a network, in particular a cluster of servers, including a server for automatically assigning individual topological addresses to the switches that it comprises, according to an embodiment of the invention.

The network 10 diagrammatically shown in FIG. 1 comprises network switches bearing the reference numerals 12, 14, 16 or 18, transmission segments bearing the reference numeral 20 for interconnecting the network switches according to a structured or non-structured topology, and compute or service nodes 30, 32, 34 connected to ports of at least one portion of the network switches. The transmission segments 20 are, in concrete terms, electrical or optical cables or ribbons for digital data transmission. In the non-limiting example shown in this figure, the network topology 10 is indirect. In other words, a portion of the switches is not directly connected to any compute or service node: this concerns the switches bearing the reference numeral 12. They are only used to receive data originating from or to transmit data to other switches of the network 10.

Other switches are directly connected, by at least one of the ports thereof, to compute or service nodes 30: this concerns the switches bearing the reference numeral 14, only one of which is shown in FIG. 1.

According to an embodiment of this invention, the network 10 comprises a specific service node, referred to as an assignment server and bearing the reference numeral 32, the function whereof is to automatically assign individual topological addresses to the network switches of the network 10. This assignment server 32 is connected to one of the ports of a specific switch of the network 10 identified by the reference numeral 16. Alternatively, the assignment server 32 could be external to the network 10 so as not to overload the latter, however with access to the network 10. In particular, it could form a part of a secondary network having access to the network 10.

Optionally, the network 10 comprises another specific service node, referred to as an administration database and bearing the reference numeral 34, the function whereof is to store the topological addresses assigned by the server 32 with any information on the network switches and corresponding equipment. This administration database 34 is, for example, connected to one of the ports of a specific switch of the network 10 identified by the reference numeral 18. It can be materialized by a storage disc, or a storage area, in a computer storage bay or by any other medium for data storage. It is shown in FIG. 1 in a position that is remote from the assignment server 32, but can alternatively be connected to the same switch 16, or even be integrated into the assignment server 32. Alternatively, it can be connected to no network switch, but to a node of the network 10, for example by being integrated into a RAM (or Random Access Memory) of one of the nodes. Also alternatively, it could also be external to the network 10.

The network 10 comprises other compute or service nodes, in particular the nodes 30, specifically allowing a cluster of servers to be constituted in order to carry out the functions of an HPC. It should be noted that the service nodes in particular include a storage system of the HPC. Since this type of installation is also well known and capable of taking on multiple architectures, it shall not be described in more detail.

The assignment server 32 can, for example, be implemented in a computer device such as a conventional computer comprising a processor associated with one or more memories for the storage of data files and computer programs. As shown in FIG. 1, it thus functionally comprises three computer programs or three functions of the same computer program 36, 38, 40. It should more specifically be noted that the computer programs 36, 38, 40 are presented as separate, however this separation is purely functional. They could just as easily be grouped together according to any possible combination in one or more software items. Their functions could also be at least partially micro-programmed or micro-wired in dedicated integrated circuits. Thus, alternatively, the computer device implementing the assignment server 32 could be replaced by an electronic device comprised solely of digital circuits (without any computer program) for carrying out the same actions.

The first computer program 36 comprises instructions for obtaining, for each network switch of the network 10, a first individual topological address expressed in a non-hierarchical addressing system, each individual topological address comprising N identifiers, N≥2, including:

one identifier of a hierarchical level of the network switch with which it is associated in the network 10, and N−1 non-hierarchical identifier(s) of the network switch with which it is associated in the network 10.

For example, as known in the prior art, in particular in the aforementioned article by Zahavi, each first individual topological address of a network switch can be expressed in an addressing system in N-tuple. The hierarchical level identifier of each first individual topological address thus forms a first component of the N-tuple and the N−1 non-hierarchical switch identifier(s) of each individual topological address forms (form) the N−1 other component(s) of the N-tuple.

The encoding principle of each N-tuple can be relative, or not, to the position in the network 10 of the network switch that it identifies.

According to a first alternative embodiment of the invention, the first individual topological addresses of the network switches 12, 14, 16, 18 can be recorded and accessible in the administration database 34. In such a case, the first computer program 36 merely retrieves the first addresses.

According to a second alternative embodiment of the invention, the first individual topological addresses of the network switches are not fully known and recorded, only the N−1 non-hierarchical identifier(s) of each switch being recorded and accessible in the administration database 34. In such a case, the first computer program 36 does not merely retrieve the first addresses. It is also designed such that, when executed on the assignment server 32, it automatically determines a hierarchical level identifier for each network switch by assigning to the identifier a value equal to the minimum between N−1 and the minimum number of other network switches that must be passed in order to reach any one of the compute or service nodes 30, 32, 34 from the network switch considered. Thus, a first hierarchy of the network switches of the network 10 is constituted as a function of the respective "distances" thereof to the compute or service nodes.

The second computer program 38, or transcoder, comprises instructions for transcoding each first individual topological address into a second hierarchical individual topological address according to the following predefined transcoding rules of:
  subdividing the N−1 non-hierarchical switch identifier(s) as a function of a value of the hierarchical level identifier:
    into i sub-topology identifier(s), $0 \leq i \leq N-1$, separated from one another when there are at least two thereof by at least one first hierarchical level separator character, thus forming a first character string, and
    into j switch identifier(s), j=N−1−i, separated from one another when there are at least two thereof by at least one second identifier separator character that is different from the first separator character, thus forming a second character string,
  constituting the second hierarchical individual topological address by a concatenation of characters including at least the first character string, the second character string, and a third separator character between the first and second character strings.

Thus, the second hierarchical individual topological addresses reconstitute a hierarchical tree-like address structure thanks to the identified sub-topologies, from a root to the leaves of the tree. The transcoding thus carried out explicitly introduces a notion of dimension in the topological addresses themselves.

In an embodiment, for each network switch, the value of the hierarchical level identifier is in an affine relationship with the number j of switch identifier(s). By way of a non-limiting example, the hierarchical level identifier of each first individual topological address takes on a value that lies in the range 0 to N−1, where the value 0 is reserved to the network switches 14, 16, 18 having at least one port to which at least one compute or service node is connected. The network switches 14, 16, 18 are qualified as "leaf" switches, with reference to the end leaves of a tree structure.

Also by way of a non-limiting example, the number j determining the subdivision of the N−1 non-hierarchical identifier(s) of each first individual topological address is equal to the hierarchical level identifier. This choice is relevant since each leaf switch, of level 0, is thus thanks to this invention fully determined by its i=N−1 sub-topology identifier(s): there is thus no need for a specific switch identifier since it is alone in its lowest level sub-topology at the end of recurrence. Conversely, the higher the hierarchical level of a network switch, the less the network switch requires sub-topology identifier(s) to determine the position thereof in the tree reconstituted using the second hierarchical individual topological addresses and the more it can have switch identifier(s) in order to distinguish itself from other switches situated in the same sub-topology. This is beneficial since the fact that a network switch is situated higher in the reconstituted topology implies that it probably requires more switch identifiers in order to distinguish it from the others. When situated at the highest possible level, i.e. at the root of the tree, a network switch does not require a sub-topology identifier.

In practice, according to an arbitrary choice compliant with a representation commonly allowed in the tree structures of directory and file systems, the first separator character can be a slash "/". In order to be distinguished therefrom, the second separator character can thus be a period ".". The third separator character can be different from the first two, but this is not compulsory. It can also be identical to the first or to the second separator character. According to common practices in directory and file notations, the third separator character will generally be chosen such that it is identical to the first. With regard to the sub-topology or switch identifiers, this can simply involve integers, represented in binary code or according to any base chosen as a function of the network 10 considered and of the application constraints. A first separator character, i.e. a slash "/", can also be placed at the head of each second hierarchical individual topological address in order to clearly identify the root of the tree reconstituted by the set of the second hierarchical individual topological addresses.

By way of example, considering four different switches situated at four different levels of the same network, with first quadruple addresses comprising three non-hierarchical identifiers A, B and C that are the same, the four first individual topological addresses can be written as follows: (3, A, B, C), (2, A, B, C), (1, A, B, C) and (0, A, B, C). By executing the instructions of the transcoder 38, and by adding for clarity purposes the extension "_switch" to each network switch address, the following four second hierarchical individual topological addresses are respectively obtained: /A.B.C_switch for the level 3 switch situated at the root of the reconstituted tree structure (there are thus i=0 sub-topology identifier and j=3 switch identifiers in this second topological address), /A/B.C_switch for the level 2 switch (there are thus i=1 sub-topology identifier and j=2 switch identifiers in this second topological address), /A/B/C_switch for the level 1 switch (there are thus i=2 sub-topology identifiers and j=1 switch identifier in this second topological address) and /A/B/C/_switch for the level 0 leaf switch (there are thus i=3 sub-topology identifiers and j=0 switch identifier in this second topological address). It is clear that this clever transcoding principle allows the reconstituted tree structure to be directly understood in the second hierarchical individual topological addresses, which structure then cleverly adapts to a structured record of the addresses and of information associated therewith (relative to the switches and equipment potentially connected to the ports of the switches). It is also clear that the transcoding allows the tree-like reconstitution in the second topological addresses, regardless of the structure and the number of hierarchical levels of the network 10, even if it is not a topologically tree-like network of the XGFT or PGFT type.

The third computer program 40 comprises instructions for recording the second hierarchical individual topological addresses provided by the assignment server 32 in the administration database 34.

These second hierarchical individual topological addresses can be stored, with any other information that can be associated therewith (regarding the switches and equipment connected to the switches), in a system of directories and computer files which can be automatically constituted using the second hierarchical individual topological addresses. They can themselves be automatically recorded in this system of directories and files from the succession of first separator(s) and of each sub-topology identifier that they contain. By way of example, the information regarding the switch having the aforementioned second topological address /A.B.C_switch can be stored in a file or directory "A.B.C_switch" situated at the root "/" of the system of directories and files. Similarly, the information regarding the switch having the aforementioned second topological address /A/B.C_switch can be stored in a file or directory "B.C_switch" situated in the directory "/A/" of the system of directories and files. Similarly, the information regarding the switch having the aforementioned second topological address /A/B/C_switch can be stored in a file or directory "C_switch" situated in the directory "/A/B/" of the system of directories and files. Finally, the information regarding the switch having the aforementioned second topological address /A/B/C/_switch can be stored in a file or directory "_switch" situated in the directory "/A/B/C/" of the system of directories and files.

The information regarding each network switch can comprise time stamp prefixes of any equipment that is connected thereto or of the network switch itself. They can further comprise attributes of the switch, for example the identification of the ports thereof and their status, or of the equipment thereof. They can further comprise the routing table specific to each network switch. This list is non-exhaustive.

Alternatively and in an even more beneficial manner, the second hierarchical individual topological addresses can be stored with any other information that can be associated therewith, in a database system with access keys. The second hierarchical individual topological addresses and the information associated therewith can thus be accessed in the database system using access keys that can be directly defined from the succession of first separator(s) and of each sub-topology identifier that they contain. This alternative is beneficial since the information stored in the database system is directly indexed by the second topological addresses. A plurality of administration servers can manage the network 10, each thus capable of being associated with a sub-topology which it easily accesses using the appropriate indexing.

According to a beneficial alternative embodiment, the second hierarchical individual topological addresses can be stored, with any other information that can be associated therewith, in a hash table system indexed by keys defined from the succession of first separator(s) and of each sub-topology identifier that the second hierarchical individual topological addresses contain.

Figure 2:
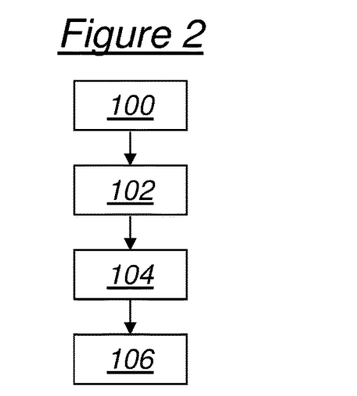
FIG. 2 shows the successive steps involved in a method for automatically assigning individual topological addresses to network switches, according to an embodiment of the invention.

The method for automatically assigning individual topological addresses to switches as shown in FIG. 2 is carried out by the assignment server 32.

During a first step 100, the first individual topological addresses of the switches 12, 14, 16, 18 of the network 10 are obtained by executing the first computer program 36.

During a second step 102, the N−1 non-hierarchical switch identifier(s) of each first individual topological address is (are) subdivided into one or more sub-topology identifiers and one or more switch identifiers by executing the second computer program 38.

During a third step 104, each second hierarchical individual topological address is constituted by character concatenation, the concatenation being automatically carried out by executing the second computer program 38.

Finally, during a fourth step 106, the second hierarchical individual topological addresses are recorded in the administration database 34, with any information associated therewith, by executing the third computer program 40.

One example of the result obtained on a highly structured network of the PGFT type will now be described with reference to FIG. 3. In this figure, in accordance with the canonical notation presented in the aforementioned article by Zahavi et al., the network 10 is a PGFT network (3; 3, 2, 2; 2, 2, 2; 2, 2, 2). At the highest hierarchical level, it comprises eight switches bearing the references S1 to S8. At the next level down, it comprises eight more switches bearing the references S9 to S16. At the next level down again, it comprises eight more switches bearing the references S17 to S24. Finally, at the lowest hierarchical level, it comprises twelve leaf switches bearing the references S25 to S36.

In accordance with the same canonical notation, the thirty-six first individual topological addresses of the thirty-six switches S1 to S36 undergo the following, by transcoding according to the principles of the embodiment of this invention described above.

The first topological address (03, 00, 00, 00) of the switch S1 is transcoded into the second hierarchical topological address /00.00.00_switch.

The first topological address (03, 00, 00, 01) of the switch S2 is transcoded into the second hierarchical topological address /00.00.01_switch.

The first topological address (03, 00, 01, 00) of the switch S3 is transcoded into the second hierarchical topological address /00.01.00_switch.

The first topological address (03, 00, 01, 01) of the switch S4 is transcoded into the second hierarchical topological address /00.01.01_switch.

The first topological address (03, 01, 00, 00) of the switch S5 is transcoded into the second hierarchical topological address /01.00.00_switch.

The first topological address (03, 01, 00, 01) of the switch S6 is transcoded into the second hierarchical topological address /01.00.01_switch.

The first topological address (03, 01, 01, 00) of the switch S7 is transcoded into the second hierarchical topological address /01.01.00_switch.

The first topological address (03, 01, 01, 01) of the switch S8 is transcoded into the second hierarchical topological address /01.01.01_switch.

The first topological address (02, 00, 00, 00) of the switch S9 is transcoded into the second hierarchical topological address /00/00.00_switch.

The first topological address (02, 00, 00, 01) of the switch S10 is transcoded into the second hierarchical topological address /00/00.01_switch.

The first topological address (02, 00, 01, 00) of the switch S11 is transcoded into the second hierarchical topological address /00/01.00_switch.

The first topological address (02, 00, 01, 01) of the switch S12 is transcoded into the second hierarchical topological address /00/01.01_switch.

The first topological address (02, 01, 00, 00) of the switch S13 is transcoded into the second hierarchical topological address /01/00.00_switch.

The first topological address (02, 01, 00, 01) of the switch S14 is transcoded into the second hierarchical topological address /01/00.01_switch.

The first topological address (02, 01, 01, 00) of the switch S15 is transcoded into the second hierarchical topological address /01/01.00_switch.

The first topological address (02, 01, 01, 01) of the switch S16 is transcoded into the second hierarchical topological address /01/01.01_switch.

The first topological address (01, 00, 00, 00) of the switch S17 is transcoded into the second hierarchical topological address /00/00/00_switch.

The first topological address (01, 00, 00, 01) of the switch S18 is transcoded into the second hierarchical topological address /00/00/01_switch.

The first topological address (01, 00, 01, 00) of the switch S19 is transcoded into the second hierarchical topological address /00/01/00_switch.

The first topological address (01, 00, 01, 01) of the switch S20 is transcoded into the second hierarchical topological address /00/01/01_switch.

The first topological address (01, 01, 00, 00) of the switch S21 is transcoded into the second hierarchical topological address /01/00/00_switch.

The first topological address (01, 01, 00, 01) of the switch S22 is transcoded into the second hierarchical topological address /01/00/01_switch.

The first topological address (01, 01, 01, 00) of the switch S23 is transcoded into the second hierarchical topological address /01/01/00_switch.

The first topological address (01, 01, 01, 01) of the switch S24 is transcoded into the second hierarchical topological address /01/01/01_switch.

The first topological address (00, 00, 00, 00) of the switch S25 is transcoded into the second hierarchical topological address /00/00/00/_switch.

The first topological address (00, 00, 00, 01) of the switch S26 is transcoded into the second hierarchical topological address /00/00/01/_switch.

The first topological address (00, 00, 00, 02) of the switch S27 is transcoded into the second hierarchical topological address /00/00/02/_switch.

The first topological address (00, 00, 01, 00) of the switch S28 is transcoded into the second hierarchical topological address /00/01/00/_switch.

The first topological address (00, 00, 01, 01) of the switch S29 is transcoded into the second hierarchical topological address /00/01/01/_switch.

The first topological address (00, 00, 01, 02) of the switch S30 is transcoded into the second hierarchical topological address /00/01/02/_switch.

The first topological address (00, 01, 00, 00) of the switch S31 is transcoded into the second hierarchical topological address /01/00/00/_switch.

The first topological address (00, 01, 00, 01) of the switch S32 is transcoded into the second hierarchical topological address /01/00/01/_switch.

The first topological address (00, 01, 00, 02) of the switch S33 is transcoded into the second hierarchical topological address /01/00/02/_switch.

The first topological address (00, 01, 01, 00) of the switch S34 is transcoded into the second hierarchical topological address /01/01/00/_switch.

The first topological address (00, 01, 01, 01) of the switch S35 is transcoded into the second hierarchical topological address /01/01/01/_switch.

The first topological address (00, 01, 01, 02) of the switch S36 is transcoded into the second hierarchical topological address /01/01/02/_switch.

Moreover, the reconstituted sub-topologies themselves can beneficially be identified using this pattern of second hierarchical individual topological addresses. For example "/" identifies the entire network 10, i.e. the "root" topology that contains the network switches S1, S2, S3, S4, S5, S6, S7, S8 in addition to the sub-topologies "/00/" and "/01/"; "/00/" identifies the sub-topology containing the network switches S9, S10, S11, S12, in addition to the sub-topologies "/00/00/" and "/00/01/"; "/00/00/" identifies the sub-topology containing the network switches S17, S18, in addition to the sub-topologies "/00/00/00/" and "/00/00/01/"; "/00/00/00/" identifies the sub-topology containing the network switch S25; etc. It should be noted that the sub-topologies are thus recursively organized into a tree structure from the root "/" as far as the leaf switches.

Figure 3:
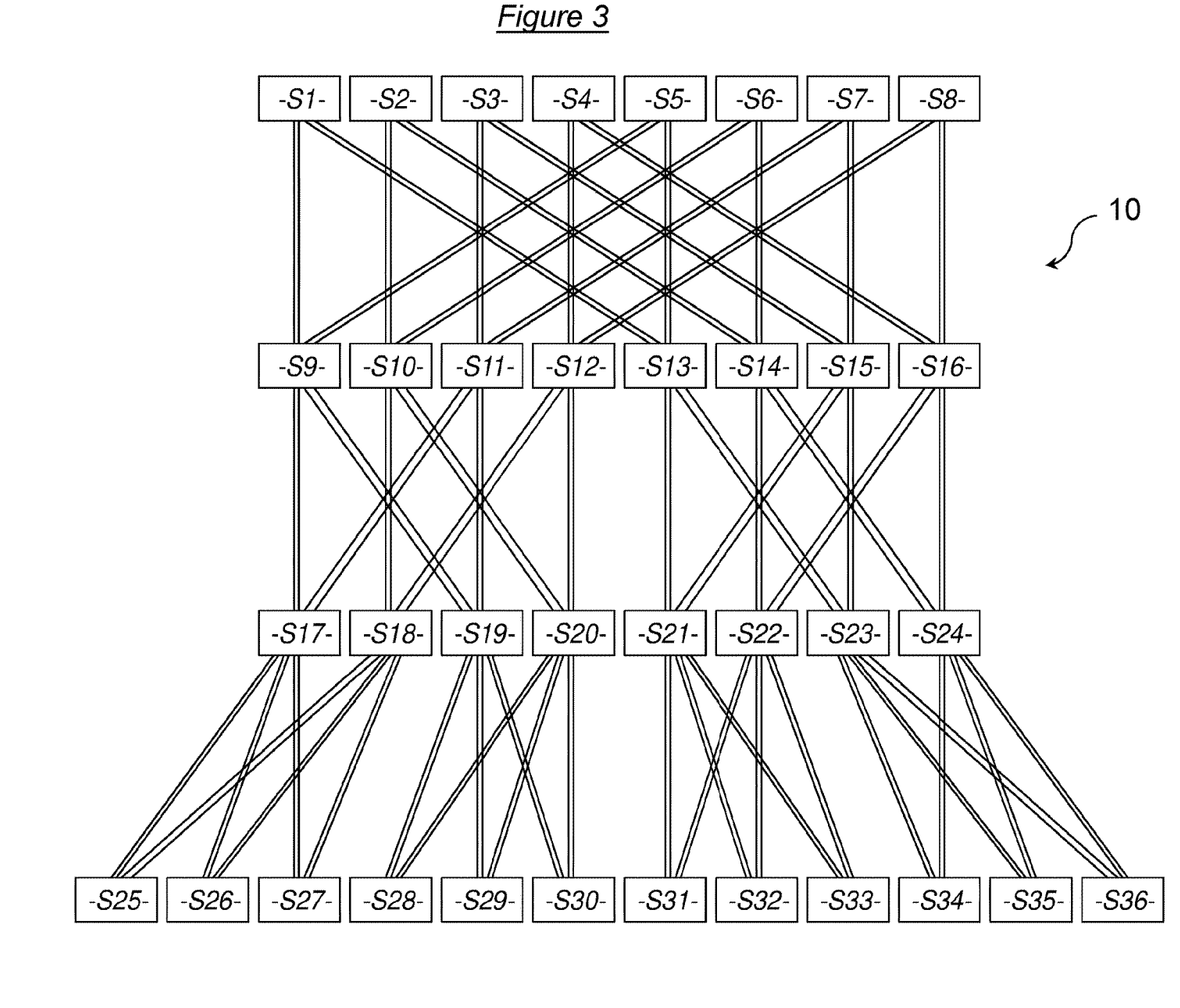
FIGS. 3 and 4 show two very different examples of network topologies to which the method of FIG. 2 can be applied.

One representation in the form of a recursive hierarchical list of the second topological addresses of the switches and sub-topologies of the network 10 in FIG. 3 can thus be naturally proposed:

/
/00.00.00_switch (for S1)
/00.00.01_switch (for S2)
/00.01.00_switch (for S3)
/00.01.01_switch (for S4)
/01.00.00_switch (for S5)
/01.00.01_switch (for S6)
/01.01.00_switch (for S7)
/01.01.01_switch (for S8)
/00/
/00/00.00_switch (for S9)
/00/00.01_switch (for S10)
/00/01.00_switch (for S11)
/00/01.01_switch (for S12)
/00/00/
/00/00/00_switch (for S17)
/00/00/01_switch (for S18)
/00/00/00/
/00/00/00/_switch (for S25)
/00/00/01/
/00/00/01/_switch (for S26)
/00/00/02/
/00/00/02/_switch (for S27)
/00/01/
/00/01/00_switch (for S19)
/00/01/01_switch (for S20)
/00/01/00/
/00/01/00/_switch (for S28)
/00/01/01/
/00/01/01/_switch (for S29)
/00/01/02/
/00/01/02/_switch (for S30)
/01/
/01/00.00_switch (for S13)
/01/00.01_switch (for S14)
/01/01.00_switch (for S15)
/01/01.01_switch (for S16)
/01/00/
/01/00/00_switch (for S21)

/01/00/01_switch (for S22)
/01/00/00/
/01/00/00/_switch (for S31)
/01/00/01/
/01/00/01/_switch (for S32)
/01/00/02/
/01/00/02/_switch (for S33)
/01/01/
/01/01/00_switch (for S23)
/01/01/01_switch (for S24)
/01/01/00/
/01/01/00/_switch (for S34)
/01/01/01/
/01/01/01/_switch (for S35)
/01/01/02/
/01/01/02/_switch (for S36)

The transcoding proposed according to this invention is particularly beneficial for topologies that already have highly structured hierarchies, such as XGFT or PGFT topologies. However, to a lesser degree, it is easily understood that this is also advantageous for indirect topologies with little or no structure. It is also beneficial for direct topologies in which a plurality of hierarchical levels of the network switches can be identified.

The worst situation is that of a network having a direct topology without any specific structure wherein all switches are by default at the same level. To a lesser degree, one example of a particularly disadvantageous situation is shown in FIG. 4 and it will now be shown that even in this disadvantageous case, the transcoding proposed remains beneficial.

In this figure, the network 10 has a direct topology with all switches at the same level. However, it is nonetheless structured in a mesh network in three directions X, Y and Z and comprises, in these three directions 4×3×2=24 network switches bearing the references S111 to S432 as a function of their three-dimensional coordinates, thus all at the same level 0. Using the (X, Y, Z) coordinates, a first individual topological quadruple address (0, X, Y, Z) can be obtained for each network switch.

Figure 4:
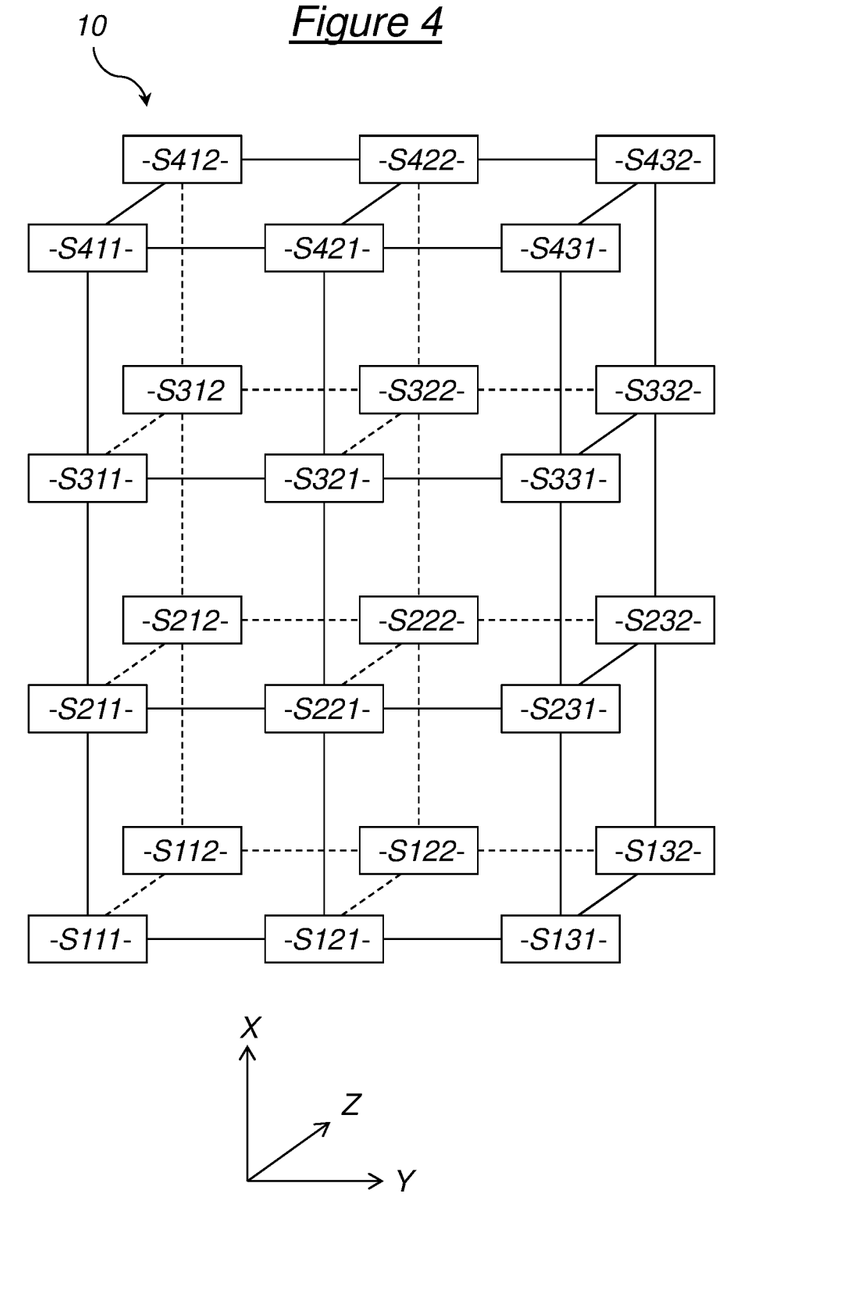

By transcoding each first individual topological address (0, X, Y, Z) according to the aforementioned principle, a representation in the form of a recursive hierarchical list of the second topological addresses of the switches and sub-topologies of the network 10 in FIG. 4 can thus be naturally proposed:
/
/00/
/00/00/
/00/00/00/
/00/00/00/_switch (for S111)
/00/00/01/
/00/00/01/_switch (for S112)
/00/01/
/00/01/00/
/00/01/00/_switch (for S121)
/00/01/01/
/00/01/01/_switch (for S122)
/00/02/
/00/02/00/
/00/02/00/_switch (for S131)
/00/02/01/
/00/02/01/_switch (for S132)
/01/
/01/00/
/01/00/00/
/01/00/00/_switch (for S211)
/01/00/01/
/01/00/01/_switch (for S212)
/01/01/
/01/01/00/
/01/01/00/_switch (for S221)
/01/01/01/
/01/01/01/_switch (for S222)
/01/02/
/01/02/00/
/01/02/00/_switch (for S231)
/01/02/01/
/01/02/01/_switch (for S232)
/02/
/02/00/
/02/00/00/
/02/00/00/_switch (for S311)
/02/00/01/
/02/00/01/_switch (for S312)
/02/01/
/02/01/00/
/02/01/00/_switch (for S321)
/02/01/01/
/02/01/01/_switch (for S322)
/02/02/
/02/02/00/
/02/02/00/_switch (for S331)
/02/02/01/
/02/02/01/_switch (for S332)
/03/
/03/00/
/03/00/00/
/03/00/00/_switch (for S411)
/03/00/01/
/03/00/01/_switch (for S412)
/03/01/
/03/01/00/
/03/01/00/_switch (for S421)
/03/01/01/
/03/01/01/_switch (for S422)
/03/02/
/03/02/00/
/03/02/00/_switch (for S431)
/03/02/01/
/03/02/01/_switch (for S432)

It should also be noted that even when choosing first individual topological addresses expressed in another format, for example (0, Z, Y, X), a representation in the form of a hierarchical recursive list of the second topological addresses of the switches and sub-topologies of the network 10 in FIG. 4 can also be naturally proposed:
/
/00/
/00/00/
/00/00/00/
/00/00/00/_switch (for S111)
/00/00/01/
/00/00/01/_switch (for S211)
/00/00/02/
/00/00/02/_switch (for S311)
/00/00/03/
/00/00/03/_switch (for S411)
/00/01/
/00/01/00/
20/00/01/00/_switch (for S121)
/00/01/01/
/00/01/01/_switch (for S221)
/00/01/02/

/00/01/02/_switch (for S321)
/00/01/03/
/00/01/03/_switch (for S421)
/00/02/
/00/02/00/
/00/02/00/_switch (for S131)
/00/02/01/
/00/02/01/_switch (for S231)
/00/02/02/
/00/02/02/_switch (for S331)
/00/02/03/
35/00/02/03/_switch (for S431)
/01/
/01/00/
/01/00/00/
/01/00/00/_switch (for S112)
/01/00/01/
/01/00/01/_switch (for S212)
/01/00/02/
/01/00/02/_switch (for S312)
/01/00/03/
/01/00/03/_switch (for S412)
/01/01/
/01/01/00/
/01/01/00/_switch (for S122)
/01/01/01/
15/01/01/01/_switch (for S222)
/01/01/02/
/01/01/02/_switch (for S322)
/01/01/03/
/01/01/03/_switch (for S422)
/01/02/
/01/02/00/
/01/02/00/_switch (for S132)
/01/02/01/
/01/02/01/_switch (for S232)
/01/02/02/
/01/02/02/_switch (for S332)
/01/02/03/
/01/02/03/_switch (for S432)

Thus, even in the disadvantageous case in FIG. 4, and independently from the choice of quadruple representation of the first individual topological addresses, the proposed automatic transcoding into second hierarchical individual topological addresses allows a structured and hierarchical identification of the switches to be obtained, thus allowing the information associated therewith to be recorded and managed in a structured manner.

It is clear that a transcoding principle such as that described above, applied to the automatic assignment of individual topological addresses to network switches, allows the arrangement of each network switch of any network whatsoever in a hierarchical structure reconstituted from the topological addresses and form the network itself to appear in each second topological address and in an explicit manner, in particular thanks to the first and second different separator characters, with the purpose of simplified handling and management of the switch addresses and information with which they are associated.

It should also be noted that the invention is not limited to the embodiments and alternatives described hereinabove. More specifically, one of ordinary skill in the art will realize that various modifications can be provided to the embodiments and alternatives described hereinabove, using the information disclosed herein. In the following claims, the terms used must not be interpreted as limiting the claims to the embodiments presented in this description, however must be interpreted to include all equivalents that the claims intend to cover via their formulation and the prediction of which is within reach of one of ordinary skill in the art when applying their general knowledge to the implementation of the information disclosed herein.

The invention claimed is:

1. A method for automatically assigning individual topological addresses to network switches of a network comprising transmission segments, said network switches interconnected via these transmission segments and compute or service nodes connected to ports of at least one portion of the network switches according to a given topology, the method which is executed by a server for automatically assigning individual topological addresses, comprising obtaining, by the assigning server and from data of an administration database, first non-hierarchical individual topological addresses expressed in a non-hierarchical addressing system for all of the network switches of the given topology, each first non-hierarchical individual topological address comprising N identifiers, N≥2, including:
   one identifier, which is an integer value, of a hierarchical level of the network switch with which it is associated in the network, and
   N−1 non-hierarchical identifier(s) of the network switch with which it is associated in the network,
wherein the method further comprises the transcoding, which is executed by a transcoder of the assigning server, of each first non-hierarchical individual topological address into a second hierarchical individual topological address expressed in a hierarchical addressing system for each network switch of the given topology according to the following transcoding steps of:
   subdividing the N−1 non-hierarchical switch identifier(s):
      into i sub-topology identifier(s), 0≤i≤N−1, separated from one another when there are at least two thereof by at least one first hierarchical level separator character, thus forming a first character string, and
      into j switch identifier(s), j=N−1−i, separated from one another when there are at least two thereof by at least one second identifier separator character that is different from the first hierarchical level separator character, thus forming a second character string,
   wherein i and j are, respectively, first and second integers determined as a function of the integer value of the hierarchical level identifier,
   constituting the second hierarchical individual topological address by a concatenation of characters including at least the first character string, the second character string, and a third separator character between the first and second character strings.

2. The method for automatically assigning individual topological addresses as claimed in claim 1, wherein:
   the first individual topological addresses are expressed in an addressing system in N-tuple,
   the hierarchical level identifier identifying the hierarchical level of each first individual topological address forms a first component of the N-tuple and takes on a value in an affine relationship with j, and
   the N−1 non-hierarchical switch identifier(s) of each individual topological address forms (form) the N−1 other component(s) of the N-tuple.

3. The method for automatically assigning individual topological addresses as claimed in claim 1, wherein the value taken by the hierarchical level identifier of each first individual topological address:

lies in the range 0 to N−1, whereby the value 0 is reserved to the network switches having at least one port to which at least one compute or service node is connected, and is equal to j.

4. The method for automatically assigning individual topological addresses as claimed in claim 1, wherein obtaining the first individual topological addresses of the network switches comprises automatically determining the hierarchical level identifier of each network switch by assigning to said identifier a value equal to the minimum between N−1 and the minimum number of other network switches that must be passed in order to reach any one of the compute or service nodes from the network switch considered.

5. The method for automatically assigning individual topological addresses as claimed in claim 1, further comprising the recording of the second hierarchical individual topological addresses in a storage device in one of the following formats:

in a system of directories and computer files automatically constituted using the second hierarchical individual topological addresses, which are themselves automatically recorded in this system of directories and files from the succession of first separator(s) and of each sub-topology identifier that they contain, or in a database system, the second hierarchical individual topological addresses being accessible in said database system using access keys defined from the succession of first separator(s) and of each sub-topology identifier that the second hierarchical individual topological addresses contain, or in a hash table system indexed by keys defined from the succession of first separator(s) and of each sub-topology identifier that the second hierarchical individual topological addresses contain.

6. The method for automatically assigning individual topological addresses as claimed in claim 1, wherein another first separator character is added at the head of each second hierarchical individual topological address in order to identify the root of a tree structure defined by the set of the second hierarchical individual topological addresses.

7. The method for automatically assigning individual topological addresses as claimed in claim 1, wherein the first separator character is a slash "/", the second separator character is a period ".", the third separator character is identical to the first separator character and each sub-topology identifier or switch identifier of each second hierarchical individual topological address is an integer.

8. A non-transitory computer-readable medium, comprising instructions for carrying out the steps of a method for automatically assigning individual topological addresses as claimed in claim 1, when said instructions are executed on a computer.

9. A server for automatically assigning individual topological addresses to network switches of a network comprising transmission segments, said network switches interconnected via these transmission segments and compute or service nodes connected to ports of at least one portion of the network switches according to a given topology, the assignment server comprising a system for obtaining, from data of an administration database, first non-hierarchical individual topological addresses expressed in a non-hierarchical addressing system for all of the network switches of the given topology, each first non-hierarchical individual topological address comprising N identifiers, N≥2, including:

one identifier, which is an integer value, of a hierarchical level of the network switch with which it is associated in the network, and N−1 non-hierarchical identifier(s) of the network switch with which it is associated in the network, wherein the server further comprises a transcoder to transcode each first non-hierarchical individual topological address into a second hierarchical individual topological address expressed in a hierarchical addressing system for each network switch of the given topology according to the following predefined transcoding rules of:

subdividing the N−1 non-hierarchical switch identifier(s):

into i sub-topology identifier(s), 0≤i≤N−1, separated from one another when there are at least two thereof by at least one first hierarchical level separator character, thus forming a first character string, and into j switch identifier(s), j=N−1−i, separated from one another when there are at least two thereof by at least one second identifier separator character that is different from the first hierarchical level separator character, thus forming a second character string, wherein i and j are, respectively, first and second integers determined as a function of the integer value of the hierarchical level identifier, constituting the second hierarchical individual topological address by a concatenation of characters including at least the first character string, the second character string, and a third separator character between the first and second character strings.

10. A cluster of servers comprising transmission segments, network switches interconnected via these transmission segments and compute and service nodes connected to ports of at least one portion of the network switches, wherein at least one service node is a server for automatically assigning individual topological addresses as claimed in claim 9.

* * * * *